(12) United States Patent
Ichihara (10) Patent No.: US 6,247,851 B1
(45) Date of Patent: Jun. 19, 2001

(54) OPTICAL CONNECTOR EMPLOYING AN OPTICAL FIBER CONNECTOR PLUG

(75) Inventor: Jun Ichihara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/433,472

(22) Filed: Nov. 4, 1999

(30) Foreign Application Priority Data

Nov. 6, 1998 (JP) .................................................. 10-316669
Nov. 6, 1998 (JP) .................................................. 10-316670

(51) Int. Cl.[7] .................................................. G02B 6/38
(52) U.S. Cl. .................................. 385/56; 385/60; 385/66; 385/70; 385/72; 385/78; 385/92; 385/139
(58) Field of Search .................................. 385/56, 52, 60, 385/66, 70, 72, 77, 78, 92, 139

(56) References Cited

U.S. PATENT DOCUMENTS 4,699,458 * 10/1987 Ohtsuki et al. ..................... 385/60 X
4,738,507 * 4/1988 Palmquist .............................. 385/60
4,867,523 * 9/1989 Scott, Jr. ............................. 385/60 X
5,129,023 * 7/1992 Anderson et al. ..................... 385/70
5,231,696 * 7/1993 Rabinovich ........................... 385/93
5,265,182 * 11/1993 Hartley ................................ 385/77
5,297,227 * 3/1994 Brown et al. ........................ 385/56
5,748,819 * 5/1998 Szentesi et al. ...................... 385/60

* cited by examiner

*Primary Examiner*—Brian Healy
(74) *Attorney, Agent, or Firm*—Hoffmann & Baron, LLP (57) ABSTRACT

An optical connector includes an elongate housing. A partition wall is formed integral with and within the housing. The partition wall is formed with a sleeve holder and an elongate hole. When an engagement member is inserted into the housing, its leg is inserted through the elongate hole. An optical module is accommodated in a case by a spring member, and the case is in turn inserted in the housing. A split sleeve of the optical module is inserted in the sleeve holder, and the engaging member is held by the partition wall and the case. When an optical fiber connector plug is inserted in the housing, a ferrule is inserted into the sleeve and coupled to a rod lens of the optical module.

16 Claims, 5 Drawing Sheets

OPTICAL CONNECTOR EMPLOYING AN OPTICAL FIBER CONNECTOR PLUG

BACKGROUND OF THE INVENTION

1. Field of the Invention

This invention relates to an optical connector which connects to an optical fiber connector plug a reception/transmission module (optical module) or optical fiber cable for use as an optical communication terminal.

2. Description of the Prior Art

In recent years, optical communications using optical fibers have been rapidly spread into utilization in the broad range of application fields. The optical fiber is extremely thin and hence difficult to completely couple thereto optical signals (reception/transmission signal). Meanwhile, if the optical fiber is incomplete in coupling, there requires output increase for the light,emitting device or sensitivity increase for the light receiving element. This however will result in cost increase.

In order to push ahead optical communications furthermore, it is desired to provide a high coupling degree of optical coupling to between an optical module or optical fiber cable and an optical fiber connector plug.

For connections between conventional optical fibers, there are prescriptions in JIS C5973-1990 on the shapes of optical connectors.

Figure 8:
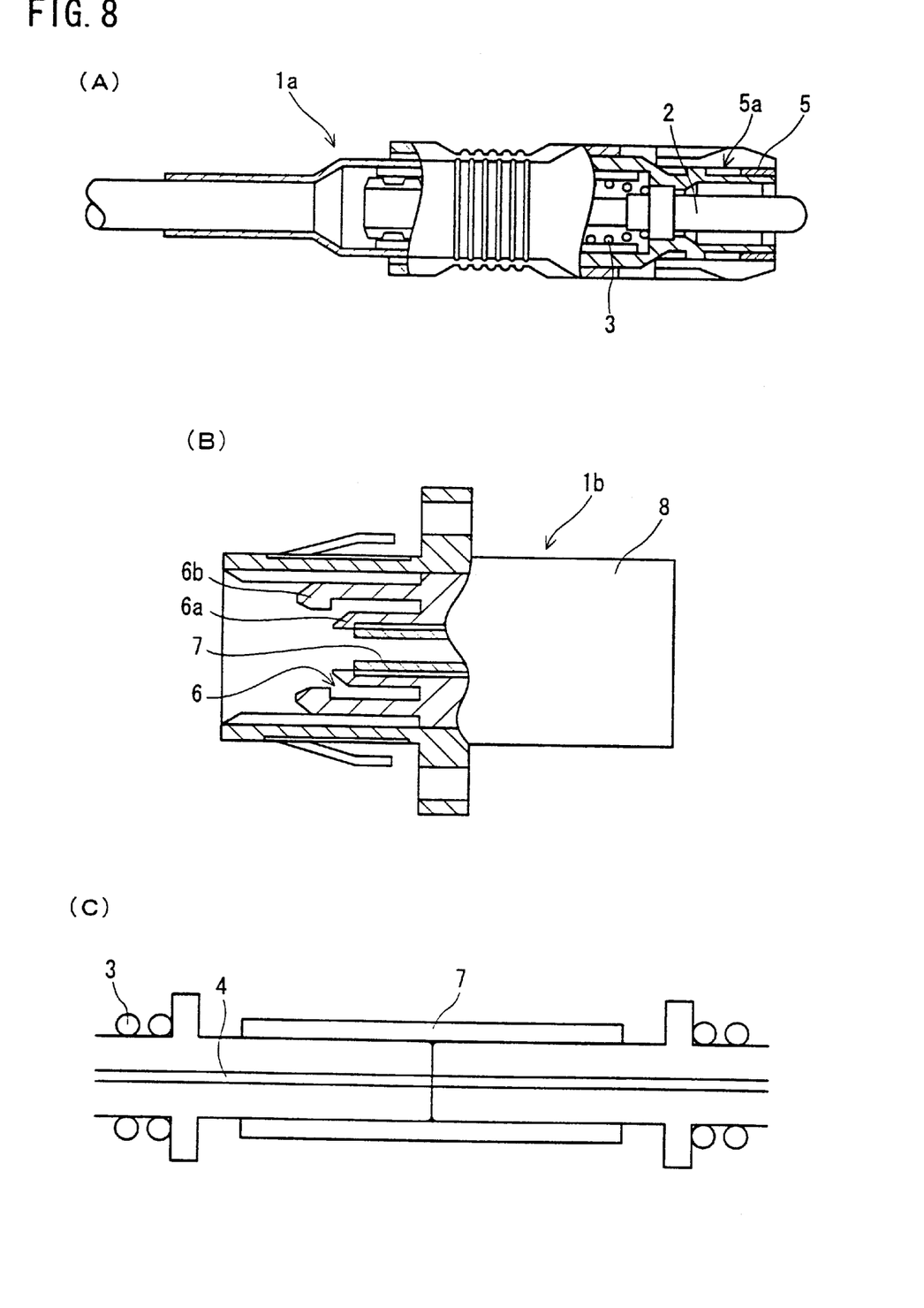

FIG. 8(A) illustrates a plug 1a. The plug 1a has a ferrule 2 held rotatable about an axis thereof by a spring 3. An optical fiber 4 (FIG. 8(C)) is held about a center of the ferrule 2. The ferrule 2 is surrounded around by a frame 5 having a recess 5a.

On the other hand, an adapter 1b, as shown in FIG. 8(B), has an integrally-formed member 6 having a sleeve holder 6a for holding a split sleeve 7 and a claw 6b for engagement with the recess 5a of the plug 1a of the frame 5. The integrally-formed member 6 is fixed within a case 8.

By inserting the plug 1a into the adapter 1b, the recess 5a of the frame 5 is fitted with the claw 6b. Thereupon, the ferrule 2 is adjusted for angular and positional deviation by the spring 3, as shown in FIG. 8(C). Furthermore, the optical fibers 4 are center-aligned by the split sleeve 7 and joined with each other.

In the prior art of FIG. 8, the sleeve holder 6a is formed separate from the case 8. Accordingly, the sleeve holder 6a in the case 8 is liable to deviate in position or angle.

Also, because the claw 6b of the adapter 1b is formed integral with the sleeve holder 6a, the claw 6b is low in positional or angular freedom. Consequently, if the integrally-formed member 6 deviates in position or angle when bonded to the case 8 as stated before, the claw 6b will also deviate in position or angle. Due to this, an imbalance force is applied to the plug 1a. As a result, the optical fibers 4 are impossible to be center-aligned completely. This results in loss of connection.

Furthermore, although the claw or engagement member 6b is formed of a plastic together with the sleeve holder 6a, the claw 6b requires elasticity for engagement with the recess 5a. Consequently, it is impossible for the claw to use a plastic usable at high temperature or employ a glass-fiber reinforced plastic. There accordingly is another problem that the prior art cannot withstand at such elevated temperature as is experienced during a solder reflow process to be conducted for mounting the optical connector onto a printed board.

SUMMARY OF THE INVENTION

It is therefore a primary object of the present invention to provide an optical connector having a novel structure.

Another object of the invention is to provide an optical connector capable of positively aligning center of optical fibers with connection loss reduced as low as possible.

Another object of the invention is to provide an optical connector capable of withstand high temperature as encountered in solder reflow or the like.

An optical connector according to the present invention is an optical connector having an optical fiber connector plug, to be connected to an optical fiber cable or optical module, having an optical fiber surrounded by a ferrule and a frame encompassing the ferrule and having a fitting portion, comprising: a housing having one end for receiving the optical fiber connector plug; an engagement member movably held in the housing and engaging the fitting portion of the frame in the housing; a split sleeve provided in the housing and receiving therein the ferrule within the housing; and an optical part center-aligned together with the optical fiber in the split sleeve and coupled to the optical fiber.

Within the housing, the engagement member is movably provided. If the optical fiber connector plug is inserted into the housing at one end thereof, the ferrule is inserted into the split sleeve and the engagement member engages the engagement portion of the frame. The split sleeve is previously inserted with the optical part, i.e. for an optical fiber cable a ferrule to protect an optical fiber, or for an optical connector a rod lens. Consequently, the ferrule of the optical fiber connector plug and the optical part are center-aligned in the split sleeve and joined with each other. At this time, because the engagement member is movably held in the housing, a spring force of the split sleeve is applied to the ferrule, thereby moving the ferrule. The force of the split sleeve applied to the ferrule is absorbed by the movability of the engagement member, enabling positive center alignment.

The split sleeve is inserted in a sleeve holder. The sleeve holder is formed in a partition wall formed in and integral with the housing. Due to this, the plug is further stabilized in position, achieving further positive center alignment for the ferrule, etc.

The housing is formed by injection-molding a plastic while the engagement member is formed by press-forming a metal sheet. Specifically, the engaging member includes a bottom plate, a hole formed in the bottom plate and inserted through by the split sleeve, a leg formed extended from the bottom plate, and a fitting portion formed in a tip of the leg to engage the fitting portion, and the housing including a support portion to movably support the engagement member. The engagement member, thus formed of metal, withstand even in a hot atmosphere as will be experienced in a solder reflow process.

The support portion includes a step formed on one surface side of the partition wall. The partition wall supports a bottom plate of the engagement member. A step is provided around the bottom plate. Consequently, the step provides a certain movable range at around the bottom plate. Due to this, the bottom plate, i.e. the engagement member, is allowed to move within the movable range.

For example, a push member as a case for accommodating an optical part previously inserted in the split sleeve is inserted into the housing at the other end thereof to thereby push the engagement member against the partition wall. Due to this, the engagement member is held within the housing. In this state, the engagement member is movable as stated before.

The case is formed, for example, by injection-molding a plastic, and includes a bottom plate, side plates formed at respective ends of the bottom plate and an accommodation space defined by the bottom and side plates. The optical part in a state of previously inserted in the split sleeve is accommodated in the accommodation space.

For example, a support member formed by pressing a metal sheet serves to movably support the optical part. By attaching the support member to the case, the optical member can be movably accommodated in the case. Because the optical member is also movable, it is possible to realize, further positively, center alignment between the ferrule and the optical part in the split sleeve, in addition to providing movability to the engagement member.

In one embodiment, the support member includes a side plate to engage the side plate of the case and a support portion formed extending from the side plate and supporting the optical part for swing and axially displacing, the side plate being engaged with the side plate of the case in a state of supporting the optical part by the support portion whereby the support member is mounted in the case.

The optical part, such as an optical fiber or optical connector, includes an electrooptic element, e.g. a laser diode and/or photodiode. A lead wire is connected to the electrooptic element in order to supply a signal to the electrooptical element or extract a signal therefrom. The lead wire is extended outward through an extraction portion provided on the case.

The case has a rear plate to seal at an end of the rear side plate, and the extension portion including a lead wire extension hole formed in the bottom plate in a position close to the rear plate and a groove that is triangular in section formed in an bottom surface of the bottom plate and having an open bottom side. The lead wire passed through the extension hole is drawn out of the groove.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing a prior art, wherein FIG. 8(A) shows an optical fiber connector plug, FIG. 8(B) an optical module, and FIG. 8(C) a state that optical fibers are joined at inside a split sleeve.

DETAILED DESCRIPTION OF THE PREFERRED EMBODIMENTS

Figure 1:
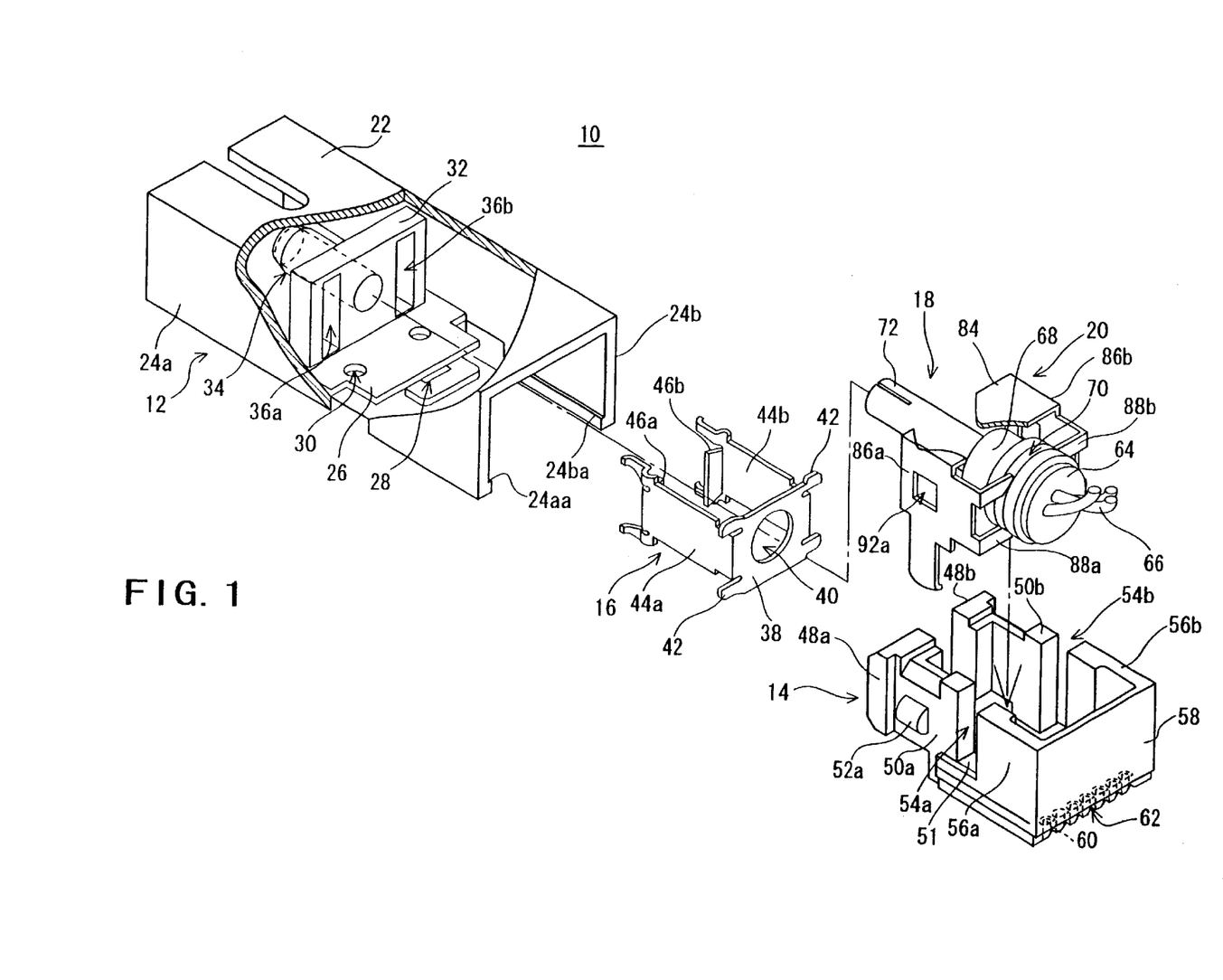
FIG. 1 is an exploded perspective view showing one embodiment of the present invention, showing a housing and spring member by partly broken away.

Referring to FIG. 1, an optical connector 10 as an embodiment of this invention is roughly constituted by five parts 12, 14, 16, 18 and 20.

The part 12 is a housing formed by injection-molding of a plastic such as liquid crystal polymer. This housing 12 is in a squared-cylinder form rectangular in section having respective open ends. The housing 12 has an overall length defined by a top plate 22 and side plates 14a and 24b. The housing 12 has a bottom plate 26 formed extending from one end thereof so that it has a length somewhat longer than a half of the overall length of the housing 12. This bottom plate 26 has, at the other end, a projection having a width of ⅓th of a total width of the bottom plate. The projection possesses springiness. The projection is formed with a hole 28 for engagement with a projection 94 (FIG. 4) formed at a tip of an underside of the part 14, or case 14. The bottom plate 26 has, at the other end, two screw holes 30. These screw holes 30 are inserted through by screws (not shown) to fix the housing 12 and the case 14 into one body.

Figure 2:
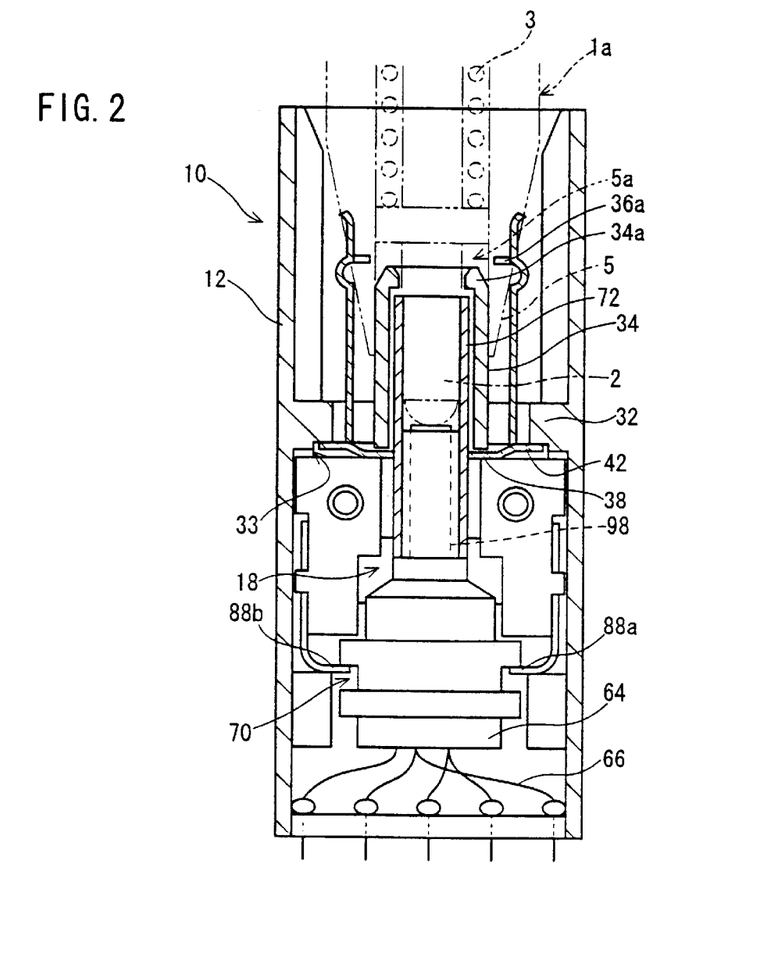
FIG. 2 is an illustrative view showing a state that the FIG. 1 embodiment optical connector is assembled.

In the housing 12, a partition wall 32 is formed at almost a lengthwise center of the housing 12. This partition wall 32 is formed, at a center, with a cylindrical sleeve holder 34 extending from a rear surface of the partition wall 32 toward the further rear thereof (toward the one end of the housing 12). This sleeve holder 34 is inserted through by a split sleeve 72, to be referred to later. The sleeve holder 34, as can be well understood from FIG. 2, can hold the split sleeve 72 with a slight gap given between them. That is, the sleeve holder 34 has an inner diameter taken slightly greater than an outer diameter of the split sleeve 72. The sleeve holder 34 has a stop 34a formed at its tip in a manner inwardly projecting, as shown in FIG. 2. The stop 34a serves to restrain and stop the sleeve 72 at its tip. The partition wall 32 is formed with vertically elongate holes 36a and 36b at respective sides thereof.

As shown in FIG. 1, the case 14 is inserted into the housing 12 at the other side of the housing 12. The case 14 is a bottomed one formed by injection-molding a plastic such as liquid crystal polymer, similarly to the housing 12. The case 14 accommodates an optical module, as referred to later.

Before inserting the case 14 into the housing 12, the part 16, i.e. engagement member 16, is inserted into the housing 12. This engagement member 16 is formed by pressing a springy metal plate such as of stainless steel, to have a bottom plate 38. The bottom plate 38 has a hole 40 opened at a center thereof. Through the hole 40 the split sleeve 72 is inserted through into the sleeve holder 34.

The bottom plate 38 has stops 42 formed projecting outward from respective four comers of the bottom plate 38. Furthermore, two legs 44a and 44b are formed rising from respective sides of the bottom plate 38. The legs 44a and 44b have, at their tips, detents, or engagement portions, 46a and 46b each formed by inwardly bending a tip middle portion. As can be well understood from FIG. 2, the stops 42 are slanted from the bottom surfaces 38 toward the legs 44a and 44b so that the stops 42 are given a leaf spring function. The legs 44a and 44b are not in parallel with but slanted close to each other as their tips are approached. Thus, the legs 44a and 44b have a spring force acting inward. The legs 44a and 44b have, at tips, outwardly bent portions provided sandwiching the detent 46a, 46b. Thus, an optical connector plug 1a (FIG. 2) is easy to insert into the housing 12.

The two legs 44a and 44b are inserted in the respective two elongate holes 36a and 36b of the partition wall 32 of the housing 12. Consequently, the legs 44a and 44b at their tips are inserted beyond the partition wall and reach a position where the sleeve holder 34 is to be clamped. Thereupon, the tops 42 are put into abutment against a front surface of the partition wall 32 at outer sides of the elongate holes 36a and 36b. As a result, the engagement member 16 is put into engagement with the partition wall 32.

After thus inserting the engagement member 16 into the housing 12, the case 14 is inserted into the housing 12. Consequently, the case 14 at its tips 48a and 48b presses against the bottom plate 38 of the engagement member 16 as shown in FIG. 2 whereby the engagement member 16 is held within the housing 12 by the housing partition wall 32 as well as the case tips 48a and 48b.

In this case, as shown in FIG. 2 a step 33 is formed in a surface of the partition wall 32 against which is abutted by the bottom surface 38 of the engagement member 16, in position outer than the tip of the stop 42. Thus, a clearance is given to between the stop 42 and the step 33. Accordingly, the stops 42, i.e. engagement member 16, are allowed to freely move in the gap to a certain extent even in a state that the detents 46a and 46b of the engagement member 16 are fitted with the recess 5a of the frame 5 of the optical fiber connector plug 1a. Therefore, the leg members 44a and 44b of the engagement member 16 can be adjusted in position and angle to a certain degree.

The case 14 has two side plates 50a and 50b formed respectively extending from the two tips 48a and 48b and rising from the bottom plate 51. The side plate 50a has a projection 52a formed on a side surface thereof. Although the side plate 50b also has a similar projection on a side surface thereof, it is in hiding and cannot be seen in FIG. 1.

At behind of the side plates 50a and 50b, two side plates 56a and 56b are formed spaced by respective gaps 54a and 54b. A rear plate 58 is formed in a manner connecting between rear ends of the side plates 56a and 56b. The bottom plate 51 in an area close to the rear plate 58 is formed with a plurality (seven in the embodiment) lead extension holes 60 as shown by dotted lines in FIG. 1, and with grooves 62 each having an opened bottom side and triangular in section to extend from a position corresponding to a lead extension hole 60 to a lower end edge of the rear plate 58. This inverted-V groove, or triangular groove, 62 has a width in opened bottom side greater than a diameter of a lead wire 66. Also, the groove 62 has a height given, of course, greater than the diameter of the lead wire 66. Accordingly, the lead wire 66 can be completely received in the groove 62. The optical module 18 mounted on the case 12 has lead wires 66 respectively extending through extension holes 60 at the rear end of the bottom plate 51 and drawn at the beneath of the grooves 62 to a rear of the case 14.

Note that the grooves 62 may be in an inverted-U shape in section instead of the inverted V-form or triangular in section as shown in the embodiment. It is however preferred that the grooves if formed to have taper surfaces converging toward an apex as of a triangle or inverted-V form are easier to lay the lead wires 66 through the grooves 62 and hence held positively.

Figure 3:
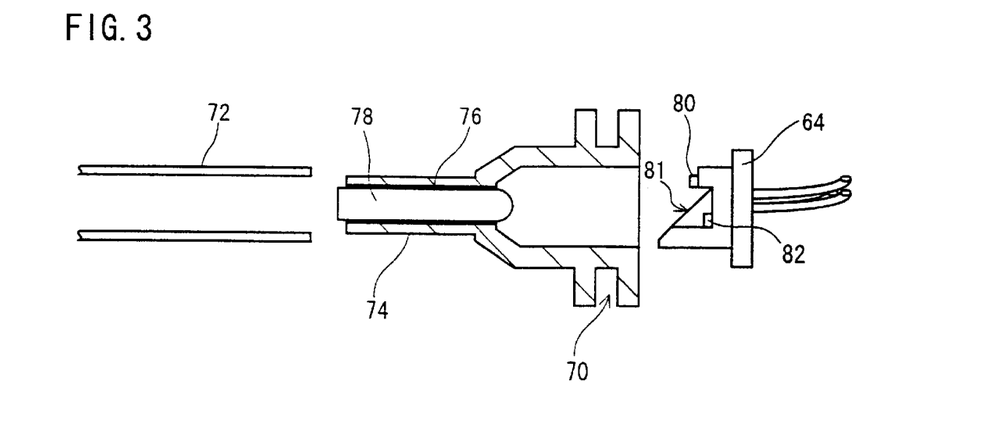
FIG. 3 is an illustrative view showing one example of an optical module used in the FIG. 1 embodiment.

The optical module 18 to be mounted in the case 14 includes, as shown in FIG. 3, a stem 64 formed, e.g. of a cold-forged steel so that lead wires 66 can be drawn out through the stem 64. At above the stem 64, a holder 68 is provided formed of metal, such as stainless steel. This holder 68 has an annular groove 70 formed in an outer periphery of a base end thereof. The holder 68 in its upper portion is formed with a cylindrical portion 74 so that a rod lens 78 can be received in the cylindrical portion 74 through, e.g., an adhesive 76 with its tip slightly exposed to the outside. A split sleeve 72 is fitted over an outer periphery of the cylindrical portion 74. The split sleeve 72 is formed of a metal material having elasticity and lubricationality, such as zirconia or phosphor bronze. The split sleeve 72 serves to center-align optical parts, i.e. the rod lens 78 and the ferrule 2 (FIG. 2) of the optical fiber connector plug 1a so that they can be optically coupled to each other.

The stem 64 of the optical module 18 has an internal surface formed with a step to have two flat surfaces. On one flat surface is mounted a transmitting device 80 such as a laser diode chip while on the other flat surface is put a receiving device 82 such as a photodiode. A half mirror 81 is arranged with inclination in front of the light receiving element 82. These light emitting device 80 and light receiving device 82 are coupled to the rod lens 78 through the half mirror 81. In the embodiment of FIG. 3, the light emitting device 80 outputs an optical signal to be reflected upon the half mirror 81 and coupled to the rod lens 78 while an optical signal inputted through the rod lens 74 from the ferrule, or optical fiber, passes through the rod lens 78 and half mirror 81 and then received by the light receiving device 82. Note that the above optical element arrangement is not limited to those of the embodiment.

The remaining one part, for constituting the optical connector 10, is a spring member 20. This spring member 20 is utilized to fit the optical module 18 in the case 14 with comparative looseness or movability. The spring member 20 is obtained by press-forming a springy metal plate such as stainless steel or phosphor bronze, similarly to the above engagement member 16. The spring member 20 includes a top plate 84, side plates 86a and 86b extending downward from respective ends of the top plate 84, and respective two engagement pieces 88a and 88b formed by inwardly bending the side plates 86a and 86b at end edges on one side thereof. The side plate 86a includes a wide upper portion and a narrow lower portion. The narrow portion has a lower end inwardly bent to have a bent portion 90a. The wide portion of the side plate 86a is formed with a rectangular hole 92a at almost a center thereof. The other side plate 86b is also formed with a similar bent portion and hole although they are in hiding and not seen in FIG. 1.

The engagement pieces 88a and 88b at the rear end of the spring member 20 are arranged opposed at their tips to each other with a predetermined spacing given between them. The engagement pieces 82a or the engagement pieces 82b, i.e. on one side, are also spaced at their tips with a predetermined spacing given between them. As shown in FIG. 1, the four engagement pieces 88a and 88b are cut out in their tips so as to cooperatively provide a circular space. These engagement pieces 88a and 88b at their tips are fitted in the annular groove formed in the holder 68 of the optical module 18 explained before. However, as will be well understood particularly from FIG. 2, a gap is provided between a bottom of the annular groove 70 and the tips of the engagement pieces 88a and. 88b. Furthermore, the engagement piece 88a, 88b has a thickness smaller than a width of the annular groove 70. Consequently, the optical module 18 is held by the engagement pieces 88a and 88b such that the optical module 18 is allowed to tilt or swing relative to an axis thereof to a certain degree and to axially move within a slight movable range. The ranges of swing angle and axial movement are defined by a gap size between the bottom of the annular groove 70 and the tip of the engagement piece 88a, 88b as well as a difference between the width of the annular groove 70 and the thickness of the engagement piece 88a, 88b.

In a state that the optical module 18 is held by the spring member 20 in this manner, the spring member 20 is fitted into the case 14. That is, the side plates 86a and 86b of the spring member 20 at their inner surfaces are positioned along the outer surfaces of the side plates 50a and 50b, and then the spring member 20 is pushed down. This causes the lower bent portion 90a of the side plate 86a to move downward beyond a lower end of the side plate 52a, whereby the projection 52a engages the hole 92a. This is true for the other side plate 86b. Thus, the spring member 20 is firmly, removably fitted in the case 14. Meanwhile, because the optical module 18 is held by the tips of the engagement pieces 88a and 88b, the optical module 18 is. naturally received in the case 14.

Then, the case 14 is inserted, together with the optical module 18, into the housing 12. In order to guide lower sides of the case 14, rails 24a and 24b inwardly projected are respectively formed along the lower sides of the side plates 24a and 24b of the housing 12.

Figure 4:
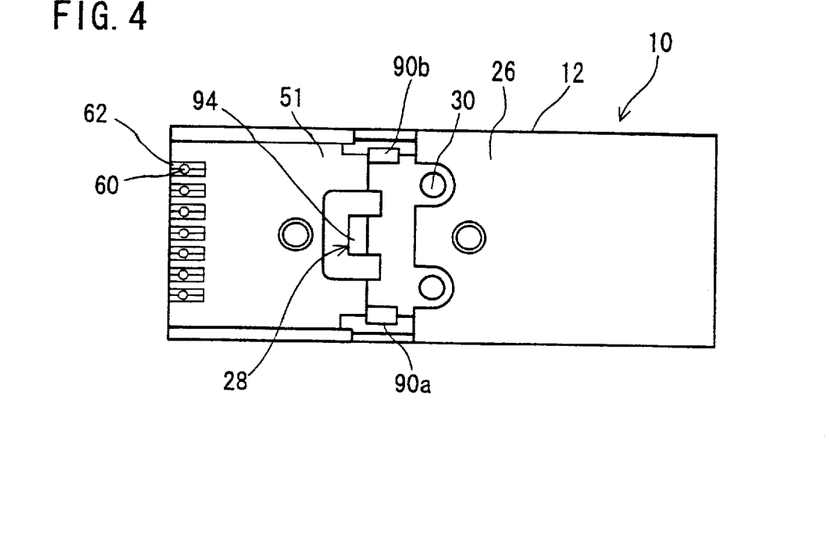
FIG. 4 is an illustrative view showing a bottom in a state that the FIG. 1 embodiment is assembled.

In this manner, an optical connector 10 is assembled as shown in FIG. 2. The assembled optical connector 10, as viewed from below, is shown in FIG. 4. That is, the projection 94 formed on an underside of the case 14 is engaged with a hole 28 formed in a tip projection of the bottom plate 26 of the housing 12. Simultaneously, the screw holes formed through the bottom plate 51 of the case 14 are overlapped with the screw holes 30 in the housing 12 so that screws (not shown) can be screwed in the screw holes. Thus, the case is firmly fixed to the housing into one body.

As shown in FIG. 2, an optical fiber connector plug 1a which is similar to that of FIG. 8(A) is inserted into the housing 12 at one end thereof. At this time, a frame 5 of the plug 1a is inserted while forcibly spreading the tips of the leg 44a and 44b of the engagement member 16. Due to this, a ferrule 2 is inserted into the split sleeve 72, and the plug 1a is further pushed inward, thereby putting the detents or engagement portions 46a and 46b of the engagement member 16 into engagement with a recess 5a of the frame 5. At this time, because the legs 44a and 44b are inclined to have a inward spring force as stated before, the spread legs 44a and 44b will return to the former state.

Because the split sleeve 72 at one side is already inserted with the rod lens 78, the ferrule 2 inserted at the other side thereof is put into abutment against a tip of the rod lens 78. The split sleeve 78 is formed by a springy metal plate as stated before, so that it evenly clamps the rod lens 78 and the ferrule 2. Consequently, the rod lens 78 and the ferrule 2 are aligned into a straight line form. At this time, the rod lens 78 and the ferrule 2 are aligned into one straight line form by the engagement member 16 movably held in the housing 12 and the optical module 18 movably held in the case by the spring member 20, cooperatively with a spring 3 being provided on the plug 1a.

That is, the springiness of the split sleeve 72 serves to align the ferrule 2 and the rod lens 78 into a straight line form. However, if the engagement member 16 or optical module 18 be fixed with positional or angular deviation, it is impossible to completely align them even if applied by a spring force of the split sleeve 72. However, if the engagement member 16, or frame 5, has a certain degree of freedom in position or angle and further the optical module 18 also has freedom in position or angle in an certain extent as in the present embodiment, the engagement member 16 or optical module 18 is allowed to be moved by a spring force of the split sleeve 72. Due to this, the ferrule 2 and the rod lens 78 can be completely aligned into a straight line form. In such a case, it will be further effective to form the engagement member 16 by a metal sheet as shown in the present embodiment. This is because the positional or angular deviation caused upon center alignment can be absorbed by the springiness of the engagement member 16.

Although the present embodiment realized positive center alignment owing to the movability of the engagement member 16 and optical module 18, such effect of center alignment is to be expected by either one of the two of the movability. For example, the optical module 18 may be completely fixed similarly to the conventional. Also, if two of the movability are given, it can be considered to omit the spring 3 from the optical fiber connector plug 1a.

Meanwhile, the engagement member 16 is formed by a metal sheet to be given elasticity. This eliminates the necessity of using a soft plastic material, as required in the conventional, for the engagement member. Thus, the engagement member 16 is capable of fully withstanding in a high temperature atmosphere as experienced during solder reflow.

Figure 5:
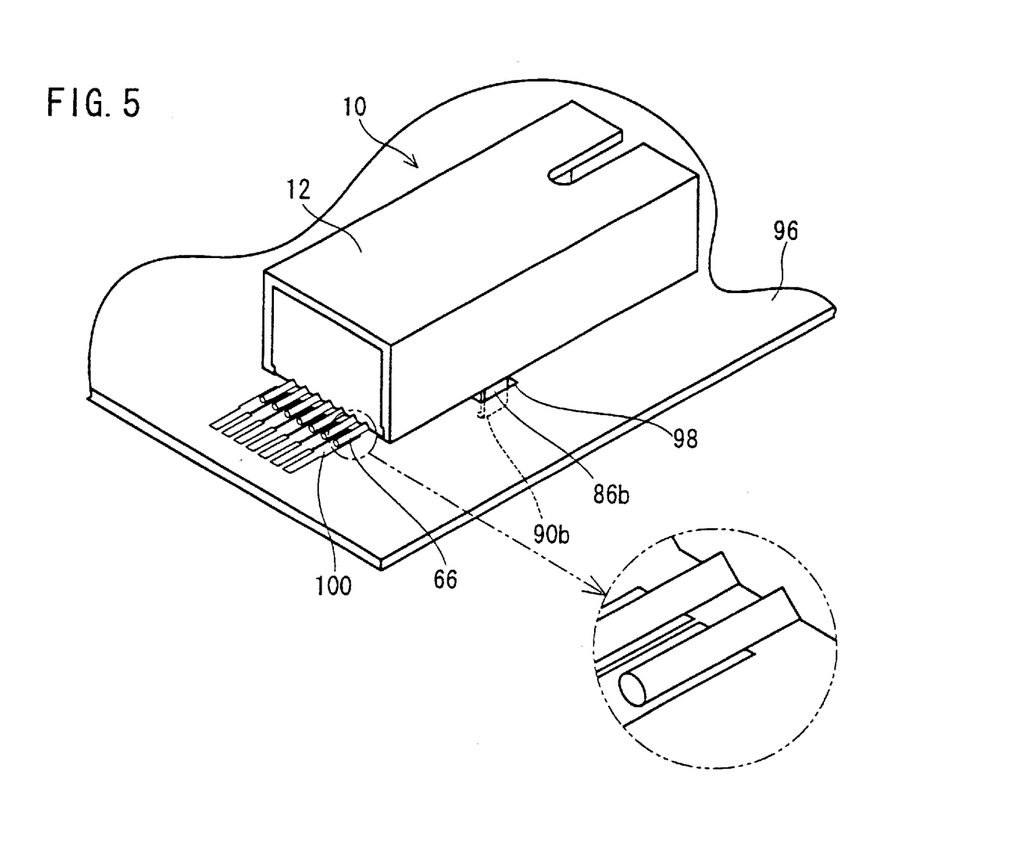
FIG. 5 is an illustrative view showing a state that FIG. 1 embodiment is mounted on a printed board.

Referring to FIG. 5, from a bottom surface of the housing 12 are exposed side plates 86a and 86b of the spring member 20 which, as shown in FIG. 1, extend downward of lower ends of the side surfaces 50a and 50b of the case 14. The exposed portions of the side plates 86a and 86b, when mounting the optical connector 10 on a printed board 96, are inserted into holes 98 of the printed board 96. Thus, the side plates 86a and 86b at their lower ends serve as means to fix the optical connector 10 onto the printed board 96.

The printed board 96 is formed, as shown in FIG. 5, with a connection pattern 100. To the connection pattern 100 are soldered lead wires 66 that are drawn through respective lead wire extension holes 60 of the case 14 and positioned in position by the respective grooves 62.

Figure 6:
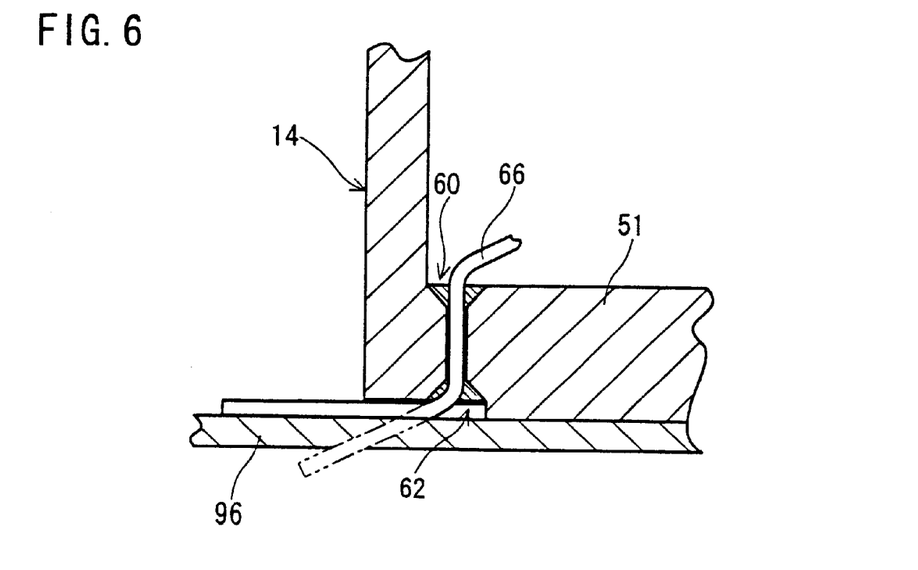
FIG. 6 is an illustrative view showing a lead-wire extension portion.

In this case, as shown in FIG. 6 each lead wire 66 extending from the optical module 18 (FIG. 1) is inserted, from above to below, into the extension hole 60 formned at a rear of the bottom plate 51 of the case 14, and restricted by a triangular groove 62 and drawn to a rearward of the case 14. Incidentally, the lead wire 66 may be fixed in the extension hole 60 through an adhesive 102. However, the lead wire 66 in the groove 62 is not fixed. After inserting the lead wire 66 through the extension hole 60, the lead wire 60 is bent by 90 degrees to a direction along the grooves 62. However, the bent lead wire 66 at its tip will extend due to its elasticity below the bottom end of the case 14, as shown by the dotted line in FIG. 6.

In this state, when the optical connector 10 is placed on the printed board 96 as shown in FIG. 5, the lead wires 66 at tips are pushed back by the printed board 96. As a result, the lead wires 66 are bent extending along a surface of the printed board 96, i.e. bottom surface of the case 14, as shown by the solid lines in FIG. 6. Even if in this case the lead wire 66 is somewhat deviated sideways, such deviation will be rectified due to the restriction on the lead wire 66 by the groove 62. That is, the lead wire 66 at its tip may extend below the bottom of the case 14, as shown by the dotted line in FIG. 6. However, if the lead wire 66 in this state is applied by an external force, the lead wire 66 is deformed. In this case, because the lead wire 66 is restricted in the extension hole 60, the lead wire 66 will not deform such as vertically bent at the tip but rotate about its base portion 66a. Consequently, when the optical connector 10, or case 14, is pressed on the printed board 96, the lead wire is caught at from its base 66a toward tip by the groove 62 and ultimately the entire from the base 66a to tip is restricted in the groove 62. Accordingly, as shown in FIG. 5 the lead wires 66 extend straight along the respective grooves 62 and fixed in the grooves of the printed board 96. By performing a solder reflow process in this state, the lead wires 66 are positively soldered to the connection pattern 100.

Figure 7:
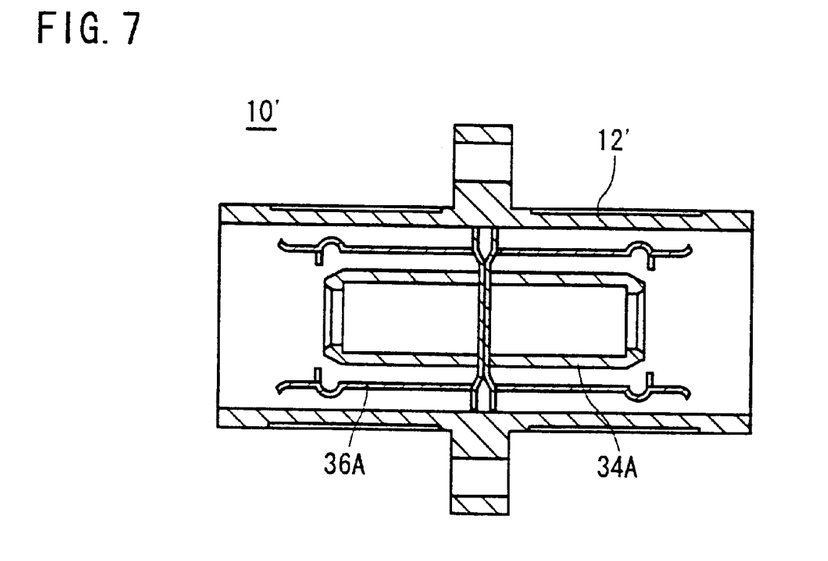
FIG. 7 is an illustrative view showing another embodiment of the invention.

Although explained in the above was the embodiment that the optical fiber connector plug was connected to the optical module, FIG. 7 shows an embodiment of connecting between optical fiber connector plugs.

In the embodiment of FIG. 7, in a housing 12' two sleeve holders 34a are formed in a back-to-back relation with a predetermined spacing given between them. Between the sleeve holders 34a, two engagement members 16a combined also in a back-to-back relation are arranged. In this case, two ferrule can be positively center-aligned due to split sleeves (omitted in FIG. 7) by movably holding the respective engagement members 16a.

In this manner, this invention is applicable to an optical connector for connecting an optical fiber connector plug to an optical module or optical fiber connector plug. For an optical module the optical component to be connected to the optical fiber connector plug includes a rod ends, while for an optical fiber connector plug such component is a ferrule.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical connector having an optical fiber connector plug, to be connected to an optical fiber cable or optical module, having an optical fiber surrounded by a ferrule and a frame encompassing said ferrule and having a fitting portion, comprising:
   a housing having one end for receiving said optical fiber connector plug;
   an engagement member movably held in said housing and engaging said fitting portion of said frame in said housing;
   a split sleeve provided in said housing and receiving therein said ferrule within said housing; and
   an optical part center-aligned together with said optical fiber in said split sleeve and coupled to said optical fiber.

2. An optical connector according to claim 1, further comprising a sleeve holder formed integral with said housing in said housing and receiving said split sleeve therein.

3. An optical connector according to claim 2, further comprising a partition wall formed in and integral with said housing, and said sleeve holder being formed in said partition wall.

4. An optical connector according to claim 1, wherein said housing is formed of a plastic, and said engaging member being formed of a metal material.

5. An optical connector according to claim 4, wherein said engaging member includes a bottom plate, a hole formed in said bottom plate and inserted through by said split sleeve, a leg formed extended from said bottom plate, and a fitting portion formed in a tip of said leg to engage said fitting portion, and said housing including a support portion to movably support said engagement member.

6. An optical connector according to claim 5, further comprising a partition wall formed in said housing, wherein said bottom plate is arranged on one surface side of said partition wall, and said leg extending toward one end of said housing through said partition wall.

7. An optical connector according to claim 6, wherein said support portion includes a step formed on one surface side of said partition wall.

8. An optical connector according to claim 5, further comprising a push member inserted in said housing at the other end thereof and pushing said engagement member against said partition wall.

9. An optical connector according to claim 8, wherein said push member includes a case to accommodate said optical part in a state of previously inserted in said split sleeve.

10. An optical connector according to claim 9, wherein said case includes side plates formed at respective ends of said bottom plate, and an accommodation space defined by said bottom plate and said side plates, and said optical part being accommodated in said accommodation space in a state of previously inserted in said split sleeve.

11. A optical connector according to claim 10, further comprising a support member for movably supporting said optical part, wherein said support member is mounted in said case.

12. An optical connector according to claim 11, wherein said support member includes a side plate to engage said side plate of said case and a support portion formed extending from said side plate and supporting said optical part swingable and axially displaceable, said side plate being engaged with said side plate of said case in a state of supporting said optical part by said support portion whereby said support member is mounted in said case.

13. An optical connector according to claim 9, wherein said optical part includes an electrooptic element and a lead wire connected to said electrooptic element, and said case including an extension portion for drawing said lead wire to an outside.

14. An optical connector according to claim 13, wherein said case has a rear plate to seal at an end of said rear side plate, and said extension portion including a lead wire extension hole formed in said bottom plate in a position close to said rear plate.

15. An optical connector according to claim 14, wherein said extension portion includes a groove triangular in section formed in an bottom surface of said bottom plate and having an open bottom side, said lead wire passed through said extension hole being drawn out of said groove.

16. An optical connector according to claim 6, further comprising a push member inserted in said housing at the other end thereof and pushing said engagement member against said partition wall.

* * * * *